US012266756B2

(12) United States Patent
Seo et al.

(10) Patent No.: US 12,266,756 B2
(45) Date of Patent: Apr. 1, 2025

(54) METHOD FOR MANUFACTURING ELECTRODE ASSEMBLY

(71) Applicant: LG Energy Solution, Ltd., Seoul (KR)

(72) Inventors: Tai Joon Seo, Daejeon (KR); Dong Hun Song, Daejeon (KR); Chun Ho Kwon, Daejeon (KR); Tai Jin Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 622 days.

(21) Appl. No.: 17/609,180

(22) PCT Filed: Sep. 23, 2020

(86) PCT No.: PCT/KR2020/012905
§ 371 (c)(1),
(2) Date: Nov. 5, 2021

(87) PCT Pub. No.: WO2021/101058
PCT Pub. Date: May 27, 2021

(65) Prior Publication Data
US 2022/0231322 A1 Jul. 21, 2022

(30) Foreign Application Priority Data

Nov. 19, 2019 (KR) .......................... 10-2019-0148933

(51) Int. Cl.
*H01M 10/04* (2006.01)
(52) U.S. Cl.
CPC ... *H01M 10/0436* (2013.01); *H01M 10/0404* (2013.01); *H01M 10/0413* (2013.01); *Y10T 29/49108* (2015.01)
(58) Field of Classification Search
CPC ............ H01M 10/0436; H01M 50/46; H01M 10/0468; H01M 10/04; Y10T 29/53135; Y10T 29/49108

(Continued)

(56) References Cited

U.S. PATENT DOCUMENTS 5,669,754 A 9/1997 Croteau et al.
9,876,251 B2* 1/2018 Tsutsumi .......... H01M 10/0422
(Continued)

FOREIGN PATENT DOCUMENTS

CN 102986080 A 3/2013
CN 104541399 A 4/2015
(Continued)

OTHER PUBLICATIONS

Extended European Search Report including Written Opinion for Application No. 20891235.2 dated Jul. 5, 2022, pp. 1-9.

(Continued)

*Primary Examiner* — Thiem D Phan
(74) *Attorney, Agent, or Firm* — Lerner David LLP (57) ABSTRACT

A method for manufacturing an electrode assembly comprises: a primary stack manufacturing step in which a first electrode and a second electrode are alternately stacked with a separator on a top surface of a table; a secondary stack manufacturing step in which the first electrode and the second electrode are alternately stacked with the separator on the primary stack so that the second electrode is stacked to be disposed at the lowermost end; a stack rotating step in which the primary stack and the secondary stack are rotated together at an angle of 180° to change positions of the primary stack and the secondary stack; and an electrode assembly manufacturing step in which the first electrode and the second electrode are alternately stacked with the separator on the primary stack so that the second electrode is stacked to be disposed at the lowermost end to manufacture a tertiary stack.

10 Claims, 10 Drawing Sheets

(58) Field of Classification Search
USPC .............................. 29/623.1, 559, 593, 623.4
See application file for complete search history.

(56) References Cited

U.S. PATENT DOCUMENTS

| | | |
|---|---|---|
| 2007/0218355 A1 | 9/2007 | Ryu et al. |
| 2012/0225345 A1 | 9/2012 | Kim |
| 2013/0260199 A1 | 10/2013 | Min et al. |
| 2014/0363725 A1 | 12/2014 | Park et al. |
| 2015/0020380 A1* | 1/2015 | Yamaura ............... H01M 6/005 29/730 |
| 2015/0340729 A1 | 11/2015 | Ko et al. |
| 2018/0261874 A1 | 9/2018 | Ko et al. |

FOREIGN PATENT DOCUMENTS

| | | |
|---|---|---|
| CN | 109698373 A | 4/2019 |
| JP | 2009530766 A | 8/2009 |
| JP | 2010257861 A | 11/2010 |
| JP | 2017135019 A | 8/2017 |
| KR | 20000010595 A | 2/2000 |
| KR | 20090008075 A | 1/2009 |
| KR | 101163053 B1 | 7/2012 |
| KR | 20130027240 A | 3/2013 |
| KR | 20140035646 A | 3/2014 |
| KR | 20140103084 A | 8/2014 |
| KR | 20160020204 A | 2/2016 |
| KR | 20160028730 A | 3/2016 |
| KR | 20160036799 A | 4/2016 |
| KR | 20160050718 A | 5/2016 |
| KR | 20160132566 A | 11/2016 |
| KR | 20170053488 A | 5/2017 |
| KR | 101806594 B1 | 12/2017 |
| KR | 2019-0056846 A | 5/2019 |
| KR | 102003728 B1 | 10/2019 |
| KR | 102043112 B1 | 11/2019 |
| WO | 2018021590 A1 | 2/2018 |

OTHER PUBLICATIONS

International Search Report for Application No. PCT/KR2020/012905, dated Jan. 8, 2021, 3 pages.

* cited by examiner

METHOD FOR MANUFACTURING ELECTRODE ASSEMBLY

CROSS-REFERENCE TO RELATED APPLICATION

The present application is a national stage entry under 35 U.S.C. § 371 of International Application No. PCT/KR2020/012905, filed on Sep. 23, 2020, published in Korean, which claims priority to Korean Patent Application No. 10-2019-0148933, filed on Nov. 19, 2019, the entire contents of which are hereby incorporated herein by reference.

TECHNICAL FIELD

The present invention relates to an apparatus and method for manufacturing an electrode assembly, which are capable of manufacturing a symmetrical electrode assembly in a new stacking manner.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

The secondary batteries are classified into a can-type secondary battery, in which an electrode assembly is embedded in a metal can, and a pouch-type secondary battery in which an electrode assembly is embedded in a pouch.

The can-type secondary battery comprises an electrode assembly, an electrolyte, a can for accommodating the electrode assembly and the electrolyte, and a cap assembly mounted on an opening of the can, and the pouch-type secondary battery comprises an electrode assembly, an electrolyte, and a pouch accommodating the electrode assembly and the electrolyte.

The electrode assembly is classified into a stacked structure, a wound type (jelly-roll type) structure, or a stack/folding type structure. The stacked structure has a structure in which electrode units (a positive electrode, a separator, and a negative electrode) constituting the electrode assembly are stacked separately from each other.

However, it is very difficult to precisely align the electrode assembly in the stacked electrode assembly described above, and in particular, there is a problem in that a defect occurs while the electrode assembly is bent.

DISCLOSURE OF THE INVENTION

Technical Problem

The present invention is invented to solve the above problems, and an object of the present invention is to provide an apparatus and method for manufacturing an electrode assembly, in which a new stacking method for the electrode assembly is proposed to improve alignment of the electrode assembly and prevent the electrode assembly from being bent, and in particular, an electrode assembly of which upper and lower portions are symmetrical to each other is manufactured.

Technical Solution

A method for manufacturing an electrode assembly according to the present invention for achieving the above object comprises: a primary stack manufacturing step (S10) in which a first electrode and a second electrode are alternately stacked with a separator therebetween on a top surface of a table so that the first electrode is stacked to be disposed at each of the uppermost end and the lowermost end; a secondary stack manufacturing step (S20) in which the first electrode and the second electrode are alternately stacked with the separator therebetween on the primary stack so that the second electrode is stacked to be disposed at the lowermost end; a stack rotating step (S30) in which the primary stack and the secondary stack, which are disposed on the table, are rotated together at an angle of 180° to change positions of the primary stack and the secondary stack; and an electrode assembly manufacturing step (S40) in which the first electrode and the second electrode are alternately stacked with the separator therebetween on the primary stack so that the second electrode is stacked to be disposed at the lowermost end to manufacture a tertiary stack.

The stack rotating step (S30) may comprise a process (S31) of gripping the primary stack and the secondary stack, which are disposed on the table, together by using a gripper, a process (S32) of allowing the table to descend away from the primary stack, a process (S33) of rotating the primary stack and the secondary stack together at an angle of 180° through the gripper, and a process (S34) of allowing the table to ascend to be supported on the secondary stack.

The stack rotating step (S30) may further comprise a process (S31a) of photographing the lowermost end of the primary stack disposed on the table by using a first photographing part and measuring a primary reference line of the primary stack from a photographed image between the process (S31) and the process (S32), a process (S35) of photographing the uppermost end of the primary stack by using a second photographing part and measuring a secondary reference line of the primary stack from a photographed image after the process (S34), and a process (S36) of comparing positions of the primary reference line and the secondary reference line with each other through a measuring part to calculate an error value.

The reference line may be a line by which the primary stack disposed on the table is equally divided to be symmetrical to each other in a width direction or a longitudinal direction.

In the electrode assembly manufacturing step (S40), the separator, the first electrode, and the second electrode may move by the error value and be stacked on the primary stack.

The electrode assembly manufactured by the electrode assembly manufacturing step (S40) may have a stacked structure of which upper and lower portions are symmetrical to each other with respect to a center.

The primary stack manufacturing step (S10) may comprise a process of allowing the table to descend so that the uppermost end of the stack stacked on the table is constantly maintained in height.

The electrode assembly manufacturing step (S40) may comprise a process of allowing the table to descend so that the uppermost end of the stack stacked on the table is constantly maintained in height.

In secondary stack manufacturing step (S20), the second electrode may be stacked at the uppermost end.

In the electrode assembly manufacturing step (S40), the second electrode may be stacked at the uppermost end.

The method may further comprise, after the electrode assembly manufacturing step (S40), a bonding step (S50) of pressing the electrode assembly at a set pressure to bond the electrode assembly.

An apparatus for manufacturing an electrode assembly according to the present invention comprises: a table; a loading member configured to alternately stack a first electrode and a second electrode with a separator therebetween on a top surface of the table to manufacture a stack; a gripper configured to grip the stack stacked on the table to rotate the stack at an angle of 180°; and a measuring member comprising a first photographing part configured to primarily photograph the lowermost end of the stack stacked on the table, a second photographing part configured to secondarily photograph the uppermost end of the stack after rotating the stack at the angle of 180°, and a measuring part configured to calculate an error value by comparing a primary reference line measured from a primarily photographed image of the stack with a secondary reference line measured from a secondarily photographed image of the stack.

The loading member may be configured to stack the separator, the first electrode, and the second electrode on the top surface of the stack while moving by the error value after rotating the stack at the angle of 180°.

When the gripper grips the stack, the table may descend away from the stack.

Each of the photographing parts may comprise an infrared camera.

Advantageous Effects

The method for manufacturing the secondary battery according to the present invention may comprise the primary stack manufacturing step (S10), the secondary stack manufacturing step (S20), the stack rotating step (S30), and the electrode assembly manufacturing step (S40). Therefore, the electrode assembly may be manufactured through the new stacking method, and the electrode assembly of which the upper and lower portions are symmetrical to each other, may be manufactured. Particularly, the electrode assembly may be prevented from being bent.

In addition, in the method for manufacturing the secondary battery according to the present invention, the stack rotating step (S30) may comprise the process (S31) of griping the primary and secondary stacks by using the gripper, the process (S32) of allowing the table to descend away from the primary stack, the process (S33) of rotating the primary and secondary stacks at the angle of 180° through the gripper, and the process (S34) of allowing the table to ascend so as to be supported on the secondary stack. Therefore, the secondary stack may be stably rotated.

In addition, in the method for manufacturing the secondary battery according to the present invention, the stack rotating step (S30) comprises the process of comparing the reference line of the primary stack before the rotation with the reference line of the primary stack after the rotation between the step (S31) and the step (S32). Therefore, it may be possible to check the position change of the primary stack, and thus, the stacked position may be corrected through the error value due to the changed position, thereby preventing the stacking failure from occurring.

In addition, in the method for manufacturing the secondary battery according to the present invention, the reference line may be set as the line by which the primary stack is equally divided to be symmetrical to each other in the width direction or the longitudinal direction. Therefore, the reference line of the radial unit may be set identically.

In addition, in the method for manufacturing the secondary battery according to the present invention, the electrode assembly manufacturing step (S40) may be performed so that the separator, the first electrode, and the second electrode move by the error value and then are stacked on the secondary stack. Therefore, the stacking failure may be previously prevented.

In the method for manufacturing the secondary battery, the primary stack manufacturing step (S10) may be performed so that the table on which the electrode and the separator are stacked constantly descends. Therefore, the height of the uppermost end of the stack stacked on the table may be constantly maintained to improve the stacking efficiency.

In the method for manufacturing the secondary battery, the electrode assembly manufacturing step (S240) may be performed so that the table on which the secondary stack is disposed constantly descends. Therefore, the height of the uppermost end of the stack stacked on the table may be constantly maintained to improve the stacking efficiency.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode Assembly According to First Embodiment of the Present Invention]

Figure 1:
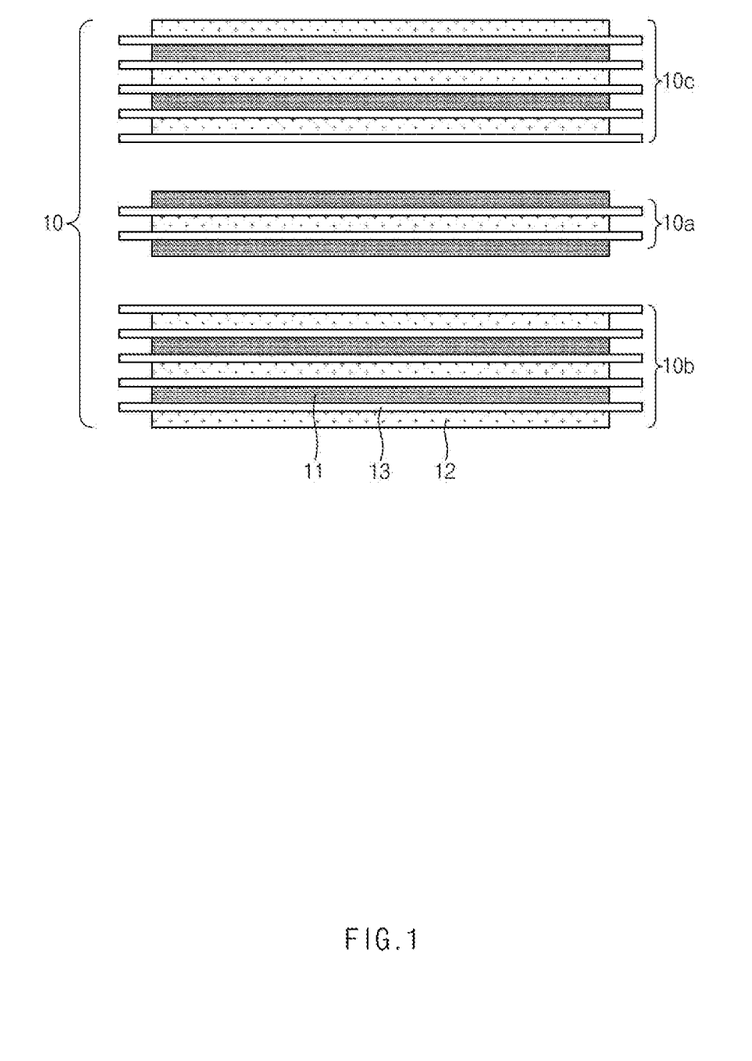
FIG. 1 is a cross-sectional view of an electrode assembly according to a first embodiment of the present invention.
Figure 2:
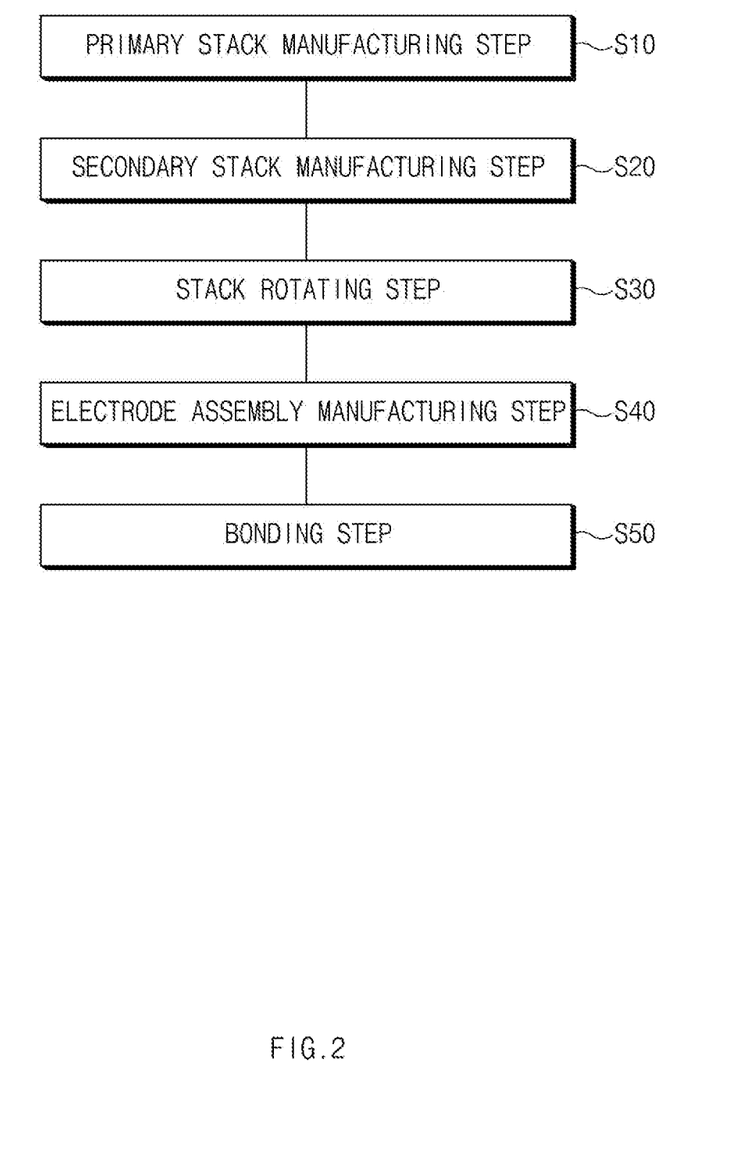
FIG. 2 is a flowchart illustrating a method for manufacturing an electrode assembly according to a second embodiment of the present invention.

As illustrated in FIG. 1, an electrode assembly 10 according to a first embodiment of the present invention comprises a primary stack 10*a*, a secondary stack 10*b* disposed under the primary stack 10*a*, and a tertiary stack 10*c* disposed on the primary stack 10*a*.

Primary Stack

In the primary stack 10a, a first electrode 11 and a second electrode 12 are alternately stacked with the separator 13 therebetween. Here, the first electrode 11 is disposed at each of the uppermost and lowermost ends. That is, in the primary stack 10a, an upper portion and a lower portion have the same stacked structure with respect to the second electrode 12, which is disposed between the upper and lower portions.

For example, the primary stack 10a has a five-layered structure in which the first electrode 11, the separator 13, the second electrode 12, the separator 13, and the first electrode 11 are sequentially stacked.

Secondary Stack

In the secondary stack 10b, when viewed in FIG. 1, the secondary stack 10b is disposed under the primary stack 10a, and the first electrode 11 and the second electrode are alternately stacked with the separator 13 therebetween. Here, the second electrode 12 is stacked to be disposed at the uppermost end corresponding to the primary stack 10a. Alternatively, the separator 13 is interposed between the first electrode 11 disposed at the lowermost end of the primary stack 10a and the second electrode 12 disposed at the uppermost end of the secondary stack 10b.

For example, the secondary stack 10b has a ten-layered structure in which the separator 13, the second electrode 12, the separator 13, the first electrode 11, the separator 13, the second electrode 12, the separator 13, the first electrode 11, the separator 13, and the second electrode 12 are sequentially stacked in a vertical direction. Here, the second electrode 12 is also disposed at the lowermost end of the secondary stack 10b.

Tertiary Stack

When viewed in FIG. 1, the tertiary stack 10c is disposed on the primary stack 10a and has a stacked structure that is symmetrical to the secondary stack 10b with respect to the primary stack 10a.

In the tertiary stack 10c, the first electrode 11 and the second electrode 12 are alternately stacked with the separator 13 therebetween on the primary stack 10a. Here, the second electrode 12 is disposed at the lowermost end corresponding to the primary stack 10a. Alternatively, the separator 13 is interposed between the first electrode 11 disposed at the uppermost end of the primary stack 10a and the second electrode 12 disposed at the lowermost end of the secondary stack 10b.

For example, the tertiary stack 10c has a ten-layered structure in which the second electrode 12, the separator 13, the first electrode 11, the separator 13, the second electrode 12, the separator 13, the first electrode 11, the separator 13, the second electrode 12, and the separator 13 are sequentially stacked in the vertical direction. Here, the second electrode 12 is also disposed at the uppermost end of the tertiary 10c.

The first electrode may be a positive electrode, and the second electrode may be a negative electrode, and vice versa.

Therefore, in the electrode assembly 10 according to the first embodiment of the present invention, the tertiary stack 10c, the primary stack 10a, and the secondary stack 10b are stacked in the vertical direction, but the secondary stack 10b and the tertiary stack 10c have a symmetrically stacked structure with respect to the primary stack 10a.

The electrode assembly 10 having the above-described structure according to the first embodiment of the present invention is manufactured using an apparatus 100 for manufacturing the electrode assembly.

[Apparatus for Manufacturing Electrode Assembly According to Second Embodiment of the Present Invention]

Figure 5:
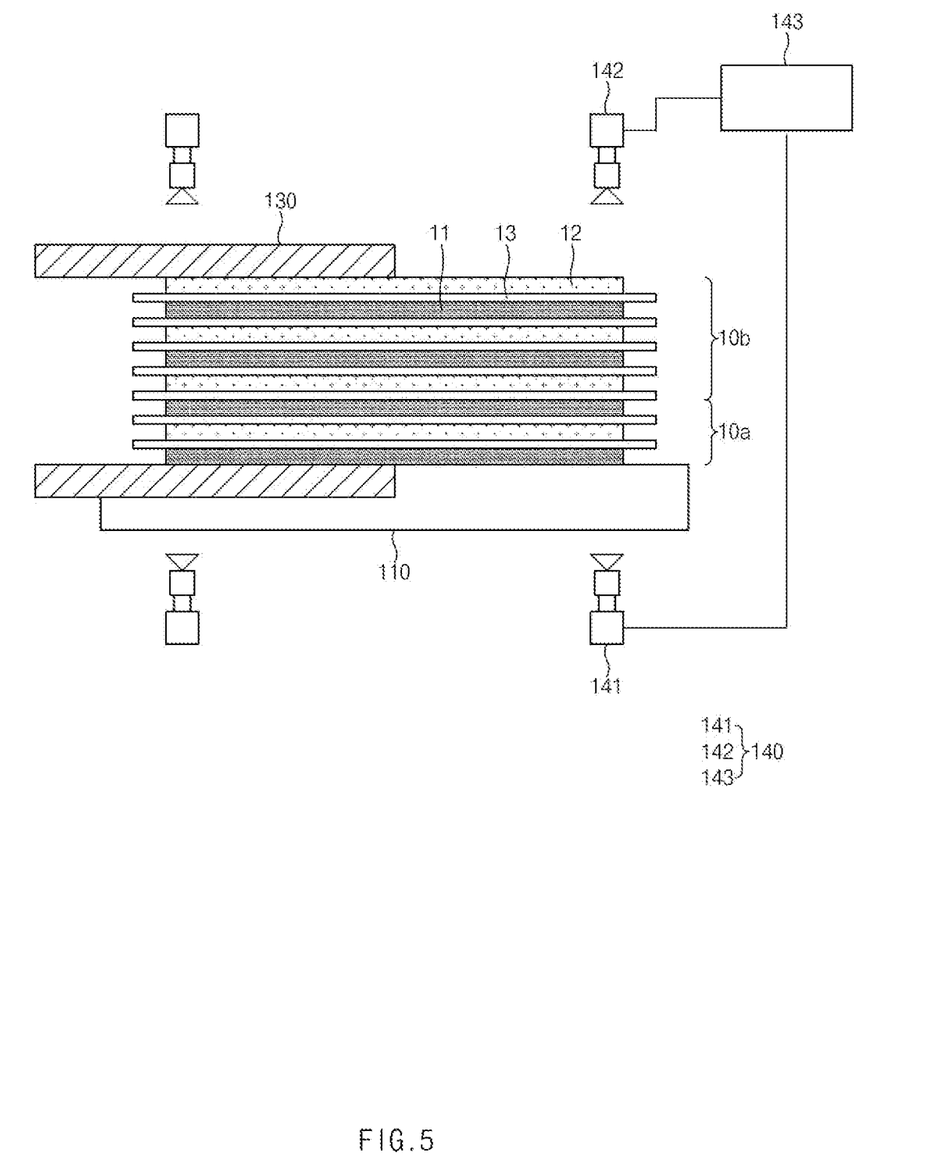
FIGS. 5 to 8 are cross-sectional views illustrating a stack rotating step (S30) in the method for manufacturing the electrode assembly according to the second embodiment of the present invention.
Figure 6:
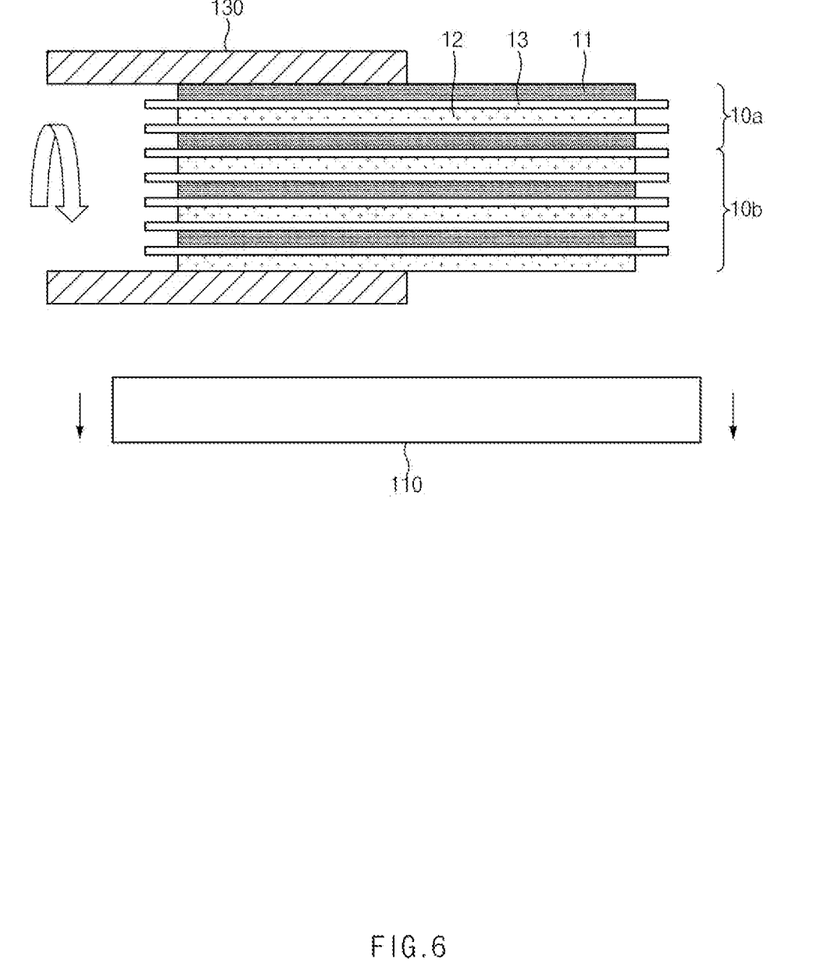
Figure 7:
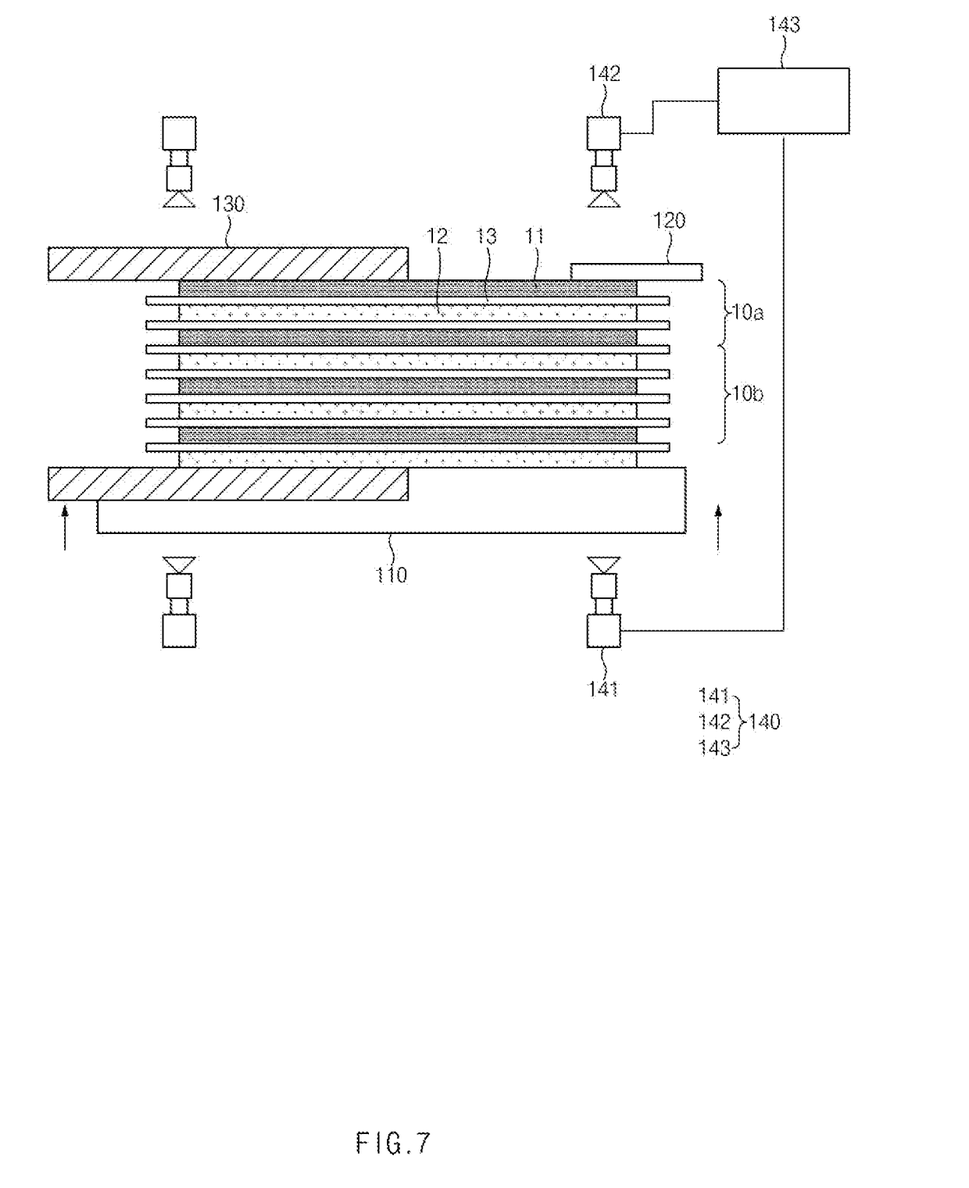
Figure 8:
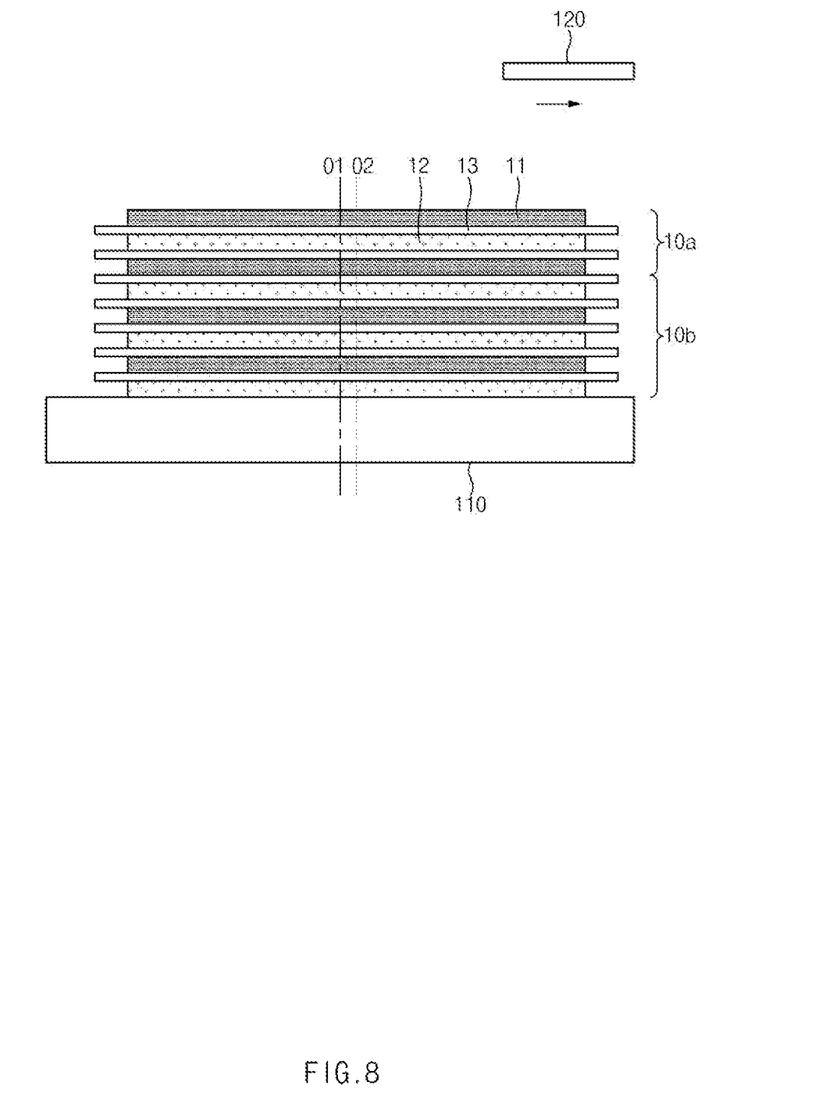
Figure 10:
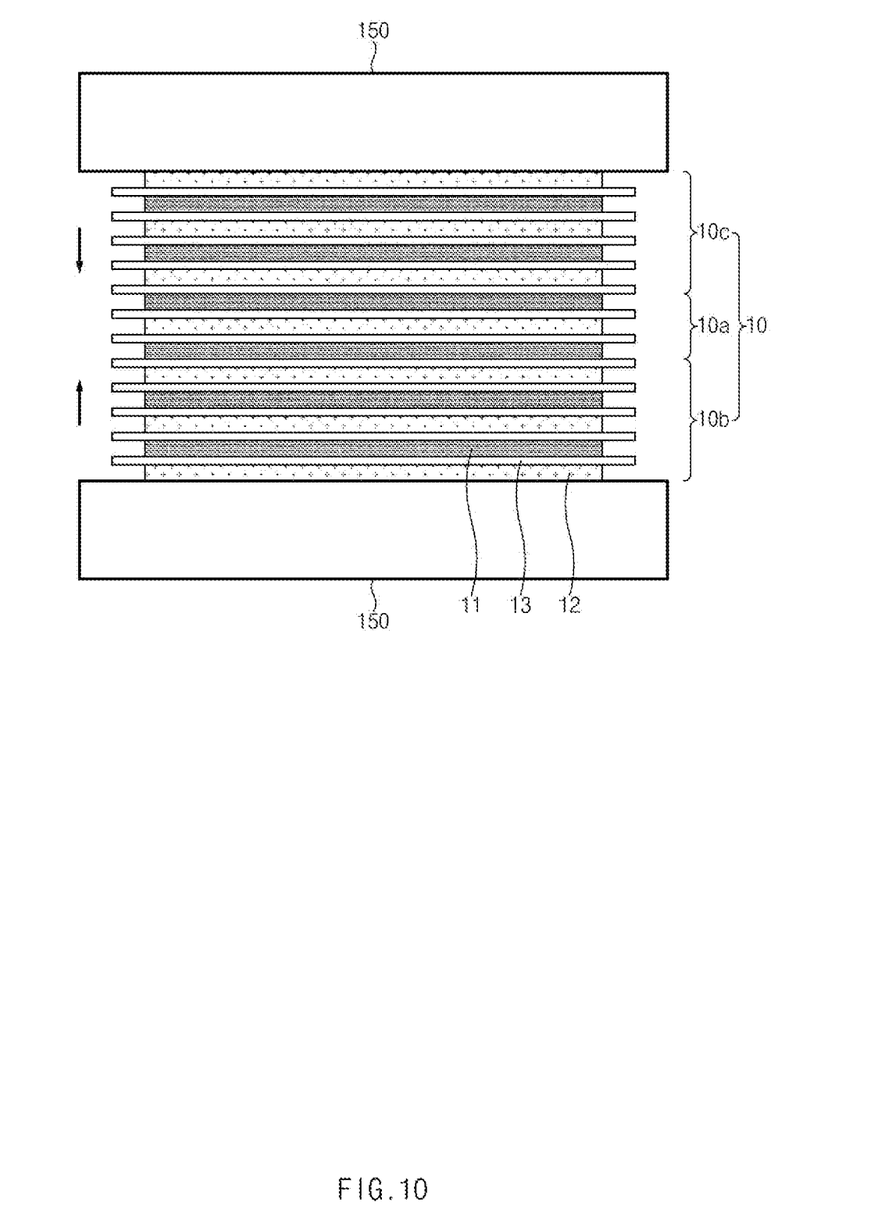
FIG. 10 is a cross-sectional view illustrating a bonding step (S50) in the method for manufacturing the electrode assembly according to the second embodiment of the present invention.

Referring to FIGS. 1, 5, and 10, an apparatus 100 for manufacturing an electrode assembly according to a second embodiment of the present invention comprises a table 110, a loading member 120 configured to alternately stack a first electrode and a second electrode with a separator therebetween on a top surface of the table 110, a gripper 130 configured to grip the stack stacked on the table 110 to rotate the stack at an angle of 180°, a measuring member 140 comprising a first photographing part 141 configured to primarily photograph the lowermost end of the stack stacked on the table 110, a second photographing part 142 configured to secondarily photograph the uppermost end of the stack after rotating the stack at the angle of 180°, and a measuring part 143 configured to calculate an error value by comparing a primary reference line measured from a primarily photographed image of the stack with a secondary reference line measured from a secondarily photographed image of the stack, and a bonding member 150 configured to bond the stack.

The loading member 120 is configured to stack the separator, the first electrode, and the second electrode on the top surface of the stack while moving by the error value after rotating the stack at the angle of 180°, thereby preventing stacking failure from occurring.

When the gripper 130 grips the stack, the table 110 may descend away from the stack to prevent the stack from being caught on the table 110 when the stack is rotated.

Each of the first and second photographing parts 141 and 142 may be an infrared camera and thus accurately photograph the stack disposed on the table 110 to measure a reference line of the stack.

Hereinafter, a method for manufacturing the electrode assembly by using the apparatus 100 for manufacturing the electrode assembly, which has the above-described constituents, according to the second embodiment of the present invention will be described.

[Method for Manufacturing Electrode Assembly According to Second Embodiment of the Present Invention]

As illustrated in FIGS. 2 to 10, a method for manufacturing an electrode assembly according to a second embodiment of the present invention comprises a primary stack manufacturing step (S10), a secondary stack manufacturing step (S20), a stack rotating step (S30), an electrode assembly manufacturing step (S40) in which a tertiary stack is manufactured to complete an electrode assembly, and a bonding step (S50) of bonding the primary stack, the secondary stack, and the tertiary stack to each other.

Primary Stack Manufacturing Step

Figure 3:
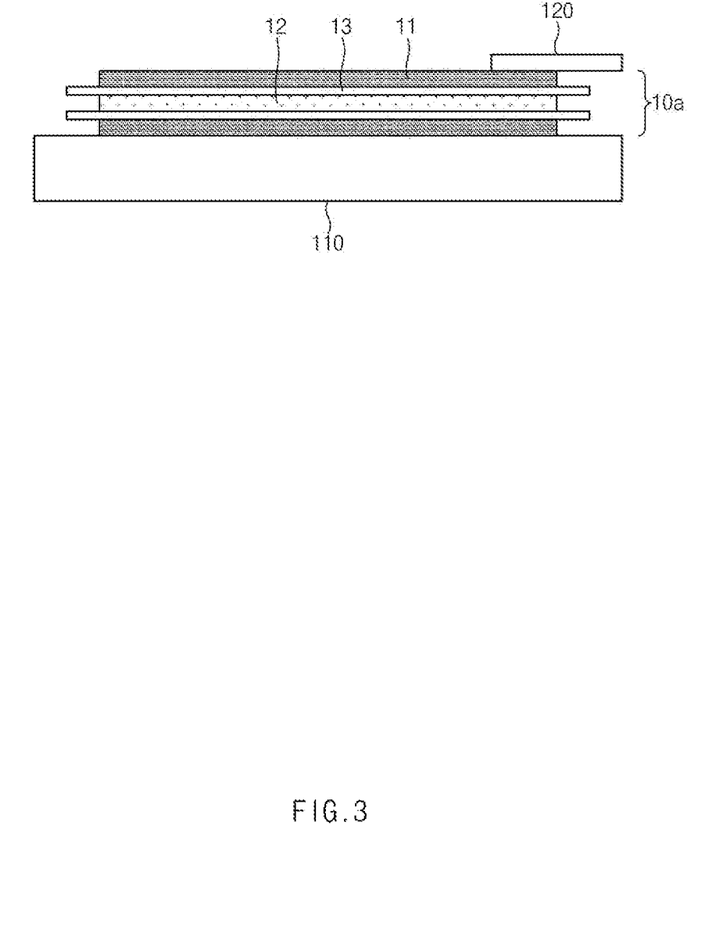
FIG. 3 is a cross-sectional view illustrating a primary stack manufacturing step (S10) in the method for manufacturing the electrode assembly according to the second embodiment of the present invention.

As illustrated in FIG. 3, in the primary stack manufacturing step (S10), a first electrode 11 and a second electrode 12 are alternately stacked with a separator 13 therebetween on a top surface of a table 110 to manufacture a primary stack 10a. Here, the first electrode 11 is stacked to be disposed at each of the uppermost and lowermost ends of the primary stack 10a. The table 110 has a flat top surface so that the primary stack 10a is disposed horizontally.

For example, in the primary stack manufacturing step (S10), a loading box in which the first electrode 11 is loaded, a loading box in which the second electrode 12 is loaded, and a loading box in which the separator 13 is loaded are prepared. Then, the first electrode 11, the second electrode 12, and the separator 13, which are loaded in the loading boxes, are selectively drawn out by using a loading member 120 so as to be stacked on the top surface of the table 110. That is, the first electrode 11, the separator 13, the second electrode 12, the separator 13, and the first electrode 11 are sequentially stacked on the top surface of the table 110 using the loading member 120 to manufacture a primary stack 10a having a five-layered structure.

The primary stack manufacturing step (S10) further comprises a process of pressing the primary stack 10a at a set pressure to bond the primary stack 10a. Thus, the first electrode 11, the second electrode 12, and the separator 13, which are disposed in the primary stack 10a, may be prevented from moving.

The primary stack manufacturing step (S10) further comprises a process of allowing the table 110 to descend so that the uppermost end of the stack stacked on the table 10 is constantly maintained in height. Therefore, it is not necessary to adjust the height of the loading member 120, and thus, the electrodes and the separators may be stably stacked on the table 110.

Secondary Stack Manufacturing Step

Figure 4:
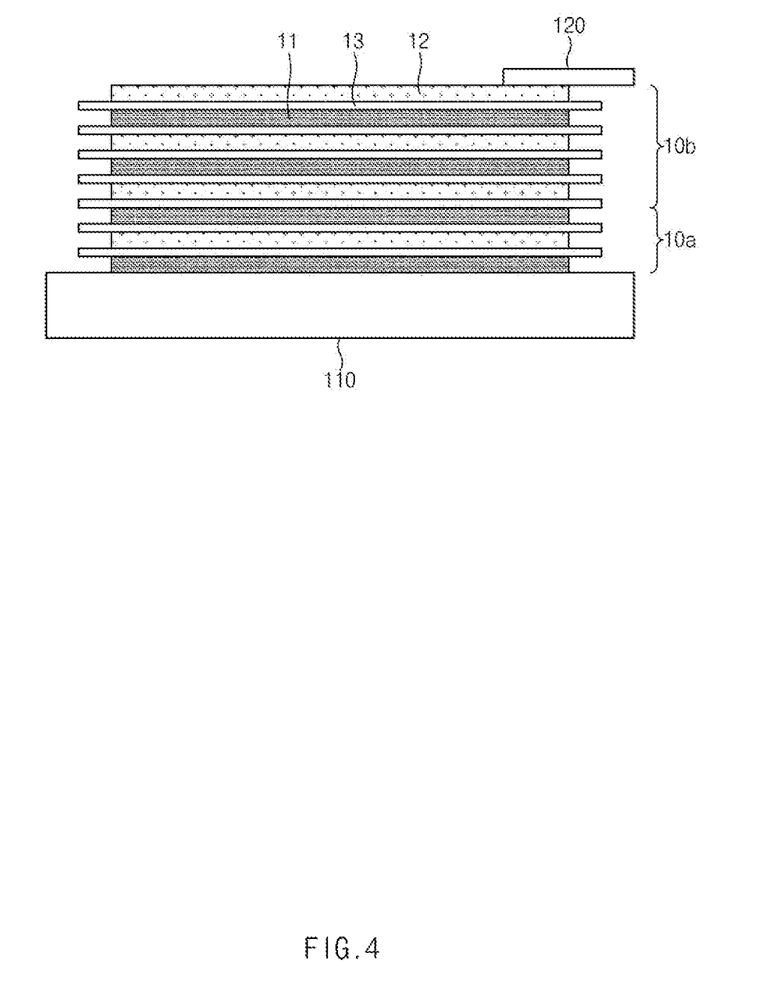
FIG. 4 is a cross-sectional view illustrating a secondary stack manufacturing step (S20) in the method for manufacturing the electrode assembly according to the second embodiment of the present invention.

As illustrated in FIG. 4, in the secondary stack manufacturing step (S20), a secondary stack 10b is manufactured on a top surface of the primary stack 10a disposed on the table 110.

That is, in the secondary stack manufacturing step (S20), the first electrode 11 and the second electrode 12 are alternately stacked with the separator 13 therebetween on the primary stack 10a to manufacture the secondary stack 10b. Here, the second electrode 12 is stacked to be disposed at the lowermost end of the secondary stack 10b.

For example, in the secondary stack manufacturing step (S20), a secondary stack 10b having a ten-layered structure in which the second electrode 12, the separator 13, the first electrode 11, the separator 13, the second electrode 12, the separator 13, the first electrode 11, the separator 13, the second electrode 12, and the separator 13 are sequentially stacked on the top surface of the primary stack 10a disposed on the table 110 in the vertical direction is manufactured. Here, upper and lower portions of the secondary stack have a symmetrically stacked structure with respect to a center of the secondary stack.

Thus, the primary stack 10a and the secondary stack 10b are disposed on the top surface of the table 110.

The secondary stack manufacturing step (S20) further comprises a process of bonding the first stack 10a and the secondary stack 10b. That is, the primary stack 10a and the secondary stack 10b, which are disposed on the table 110, may be pressed at the set pressure to improve bonding force between the primary stack 10a and the secondary stack 10b.

Stack Rotating Step

As illustrated in FIGS. 5 to 8, in the stack rotating step (S30), the primary stack 10a and the secondary stack 10b are rotated so that the primary stack 10a is disposed on the secondary stack 10b.

That is, the stack rotating step (S30) comprises a process (S31) of griping the primary stack 10a and the secondary stack 10b, which are disposed on the table 110, together by using a gripper 130, a process (S32) of allowing the table 110 to descend away from the secondary stack 10b so that the table 110 is not caught when the primary stack 10a and the secondary stack 10b are rotated, a process (S33) of rotating the primary stack 10a and the secondary stack 10b together at an angle of 180° through the gripper 130, and a process (S34) of allowing the table 110 to ascend to be supported on the secondary stack 10b.

That is, the primary stack 10a is disposed at an upper side, and the secondary stack 10b is disposed at a lower side.

The stack rotating step (S30) comprises a process of measuring a position error before and after the rotation of the primary stack 10a and the secondary stack 10b by using a measuring member 140. The measuring member 140 comprises a first photographing part 141, a second photographing part 142 and a measuring part 143.

That is, the stack rotating step (S30) comprises a process (S31a) of photographing the lowermost end of the primary stack 10a disposed on the table by using the first photographing part 141 and measuring a primary reference line O1 of the primary stack 10a from a photographed image between the process (S31) and the process (S32), a process (S35) of photographing the uppermost end of the primary stack 10a by using the second photographing part 142 and measuring a secondary reference line O2 of the primary stack 10a from a photographed image after the process (S34), and a process (S36) of comparing positions of the primary reference line O1 and the secondary reference line O2 with each other through the measuring part 143 to calculate an error value.

That is, in the stack rotating step (S30), after the rotation of the primary stack 10a and the secondary stack 10b, it is measured whether a position change occurs.

The primary and secondary reference lines refer to lines by which the primary stack 10a disposed on the table 110 is equally divided to be symmetrical to each other in a width direction or a longitudinal direction.

Electrode Assembly Manufacturing Step

Figure 9:
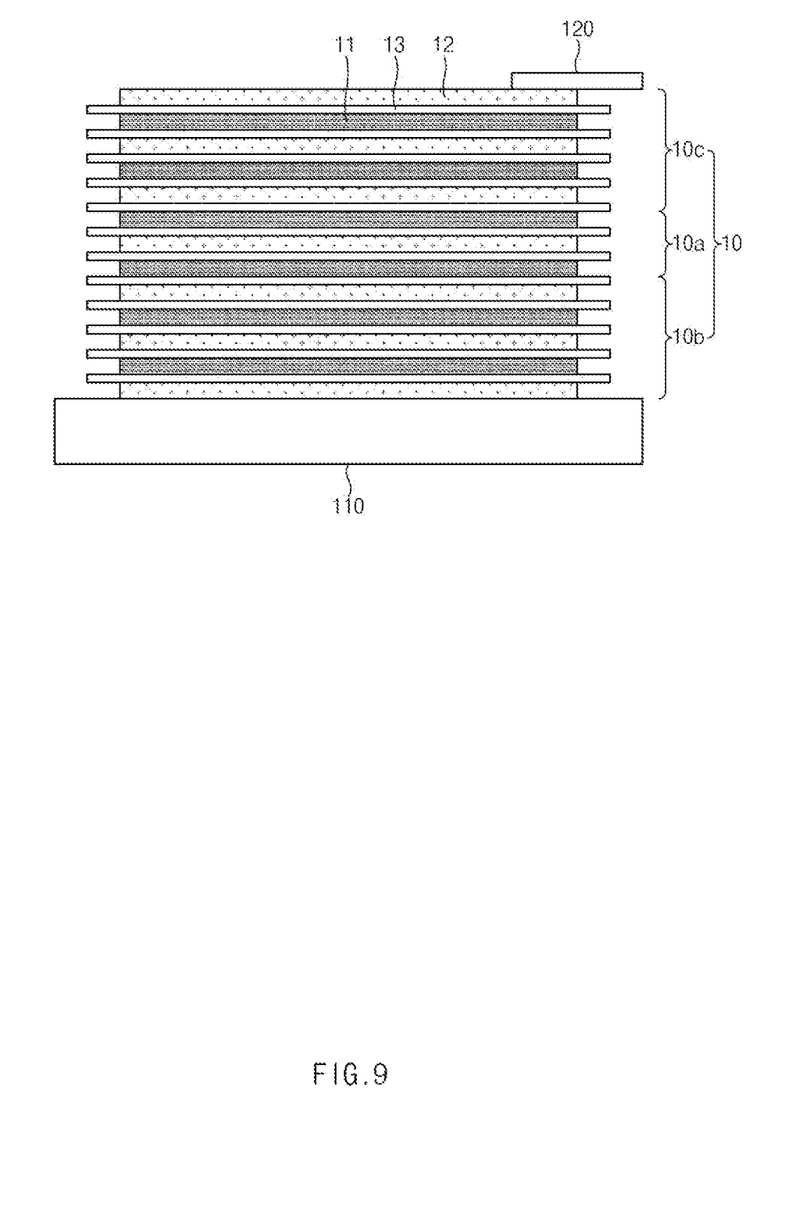
FIG. 9 is a cross-sectional view illustrating an electrode assembly manufacturing step (S40) in the method for manufacturing the electrode assembly according to the second embodiment of the present invention.

As illustrated in FIG. 9, in the electrode assembly manufacturing step (S40), a tertiary stack 10c is manufactured on the top surface of the primary stack 10a to complete an electrode assembly 10.

That is, in the electrode assembly manufacturing step (S40), the first electrode 11 and the second electrode 12 are alternately stacked with the separator 13 therebetween on the primary stack 10a disposed on the table 110 to manufacture the tertiary stack 10c. Here, the second electrode 12 is stacked at the lowermost end of the tertiary stack 10c.

Thus, in the electrode assembly manufacturing step (S40), the electrode assembly 10 in which the tertiary stack 10c, the primary stack 10a, and the secondary stack 10b are sequentially stacked may be completed.

Here, in the electrode assembly manufacturing step (S40), the separator, the first electrode, and the second electrode may move by the error value measured in the stack rotating step (S30) and then be stacked on the primary stack 10a to prevent stacking failure from occurring.

For example, in the electrode assembly manufacturing step (S40), a tertiary stack 10b having a ten-layered structure in which the second electrode 12, the separator 13, the first electrode 11, the separator 13, the second electrode 12, the separator 13, the first electrode 11, the separator 13, the second electrode 12, and the separator 13 are sequentially stacked on the top surface of the primary stack 10a disposed on the table 110 in the vertical direction is manufactured. Here, in the electrode assembly manufacturing step (S40), the second electrode 12 is stacked at the uppermost end, and accordingly, the tertiary stack has a stacked structure of which upper and lower portions are symmetrical to each other with respect to the center.

Particularly, the secondary and tertiary stacks 10b and 10c have a symmetrically stacked structure with respect to the primary stack 10a, and accordingly, a symmetrical electrode assembly may be easily manufactured. Particularly, since the secondary and tertiary stacks have the symmetrical structure, it is possible to prevent the finished-product electrode assembly from being bent.

The electrode assembly manufacturing step (S40) further comprises a process of allowing the table 110 to descend so that the uppermost end of the stack stacked on the table 110 is constantly maintained in height. Therefore, since there is no need to adjust the height of the loading member 120, the electrodes and the separators may be stably stacked.

Bonding Step As illustrated in FIG. 10, in the bonding step (S50), the electrode assembly 10 constituted by the primary, secondary, and tertiary stacks 10a, 10b, and 10c is bonded using the bonding member 150. Therefore, the finished-product electrode assembly 10 may be manufactured.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Apparatus for manufacturing electrode assembly
110: Table
120: Loading member
130: Gripper
140: Measuring member
150: Bonding member

The invention claimed is:

1. A method for manufacturing an electrode assembly, the method comprising:
a primary stack manufacturing step in which two first electrodes and a second electrode of the primary stack are alternately stacked with separators therebetween on a top surface of a table so that the first electrodes are disposed at each of an uppermost end and a lowermost end of the primary stack;
a secondary stack manufacturing step in which first electrodes and second electrodes of the secondary stack are alternately stacked with separators therebetween on top of the primary stack at a first end of the primary stack so that one of the second electrodes is disposed at a lowermost end of the secondary stack;
a stack rotating step in which the primary stack and the secondary stack, which are initially disposed on the table, are rotated together at an angle of 180° to change vertical positions of the primary stack and the secondary stack, the stack rotating step comprising gripping the primary stack and the secondary stack together using a gripper, descending the table away from the primary stack, rotating the primary stack and the secondary stack together at the angle of 180° using the gripper, and ascending the table so that the secondary stack is supported on the table; and
a tertiary stack manufacturing step in which first electrodes and second electrodes of the tertiary stack are alternately stacked with separators therebetween on top of the primary stack at a second end of the primary stack opposite from the first end so that one of the second electrodes is disposed at a lowermost end of the tertiary stack.

2. The method of claim 1, wherein the stack rotating step further comprises photographing the lowermost end of the primary stack disposed on the table by using a first photographing part and measuring a primary reference line of the primary stack from a first photographed image, photographing the uppermost end of the primary stack by using a second photographing part and measuring a secondary reference line of the primary stack from a second photographed image, and comparing positions of the primary reference line and the secondary reference line with each other through a measuring part to calculate an error value.

3. The method of claim 2, wherein the reference line is a line by which the primary stack disposed on the table is equally divided into two parts that are symmetrical to each other in a width direction or a longitudinal direction.

4. The method of claim 2, wherein, during the tertiary stack manufacturing step, the separators, the first electrodes, and the second electrodes of the tertiary stack move by a distance equaling the error value and are stacked on top of the primary stack.

5. The method of claim 1, wherein the electrode assembly manufactured by the tertiary stack manufacturing step has a stacked structure of which upper and lower portions are symmetrical to each other with respect to a center.

6. The method of claim 1, wherein the primary stack manufacturing step comprises descending the table so that an uppermost end of a portion of the primary stack that has already been stacked on the table is maintained at a constant height.

7. The method of claim 1, wherein the tertiary stack manufacturing step comprises descending the table so that the uppermost end of a portion of the tertiary stack that has already been stacked on the table is maintained at a constant height.

8. The method of claim 1, wherein, during the secondary stack manufacturing step, the second electrode is stacked at the first end of the primary stack.

9. The method of claim 1, wherein, during the tertiary stack manufacturing step, the tertiary electrode is stacked at the second end of the primary stack.

10. The method of claim 1, further comprising, after the tertiary stack manufacturing step, a bonding step of pressing the electrode assembly at a predetermined pressure to bond the electrode assembly.

* * * * *